April 27, 1954   Q. E. BASHORE   2,676,697
BOX-HANDLING APPARATUS
Filed Oct. 25, 1948   3 Sheets-Sheet 2
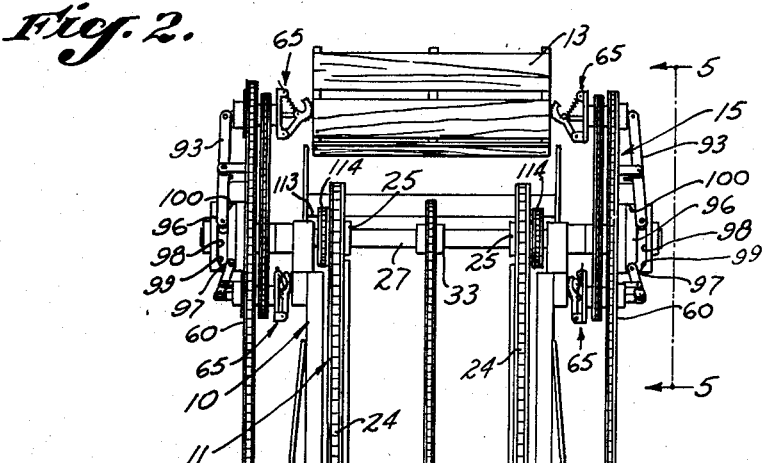
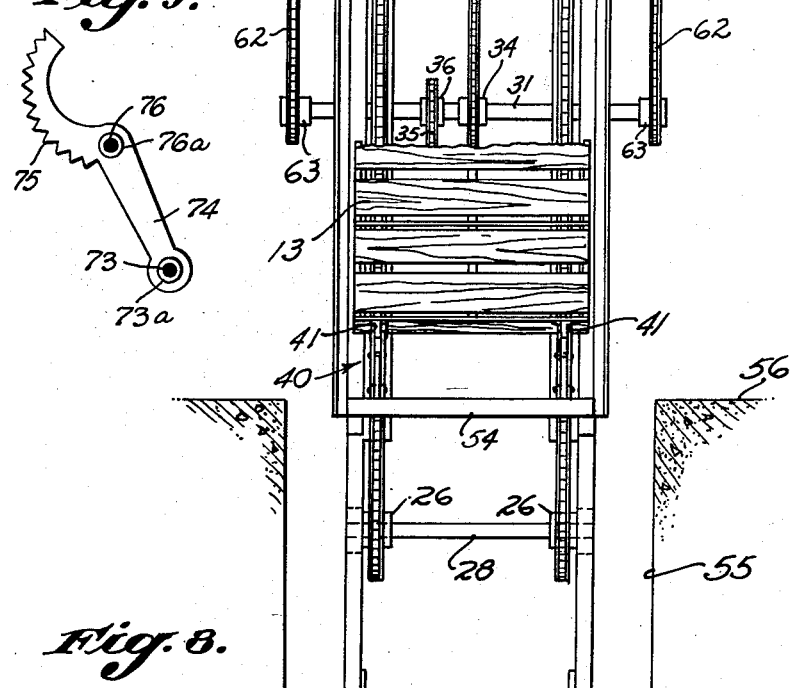
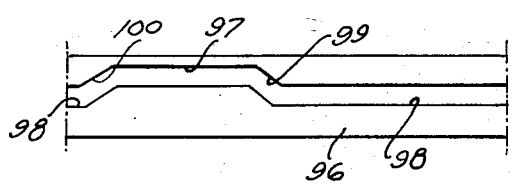
INVENTOR:
QUINTER E. BASHORE
BY HIS ATTORNEYS
HARRIS, KIECH, FOSTER & HARRIS April 27, 1954
Q. E. BASHORE
2,676,697
BOX-HANDLING APPARATUS
Filed Oct. 25, 1948
3 Sheets-Sheet 3
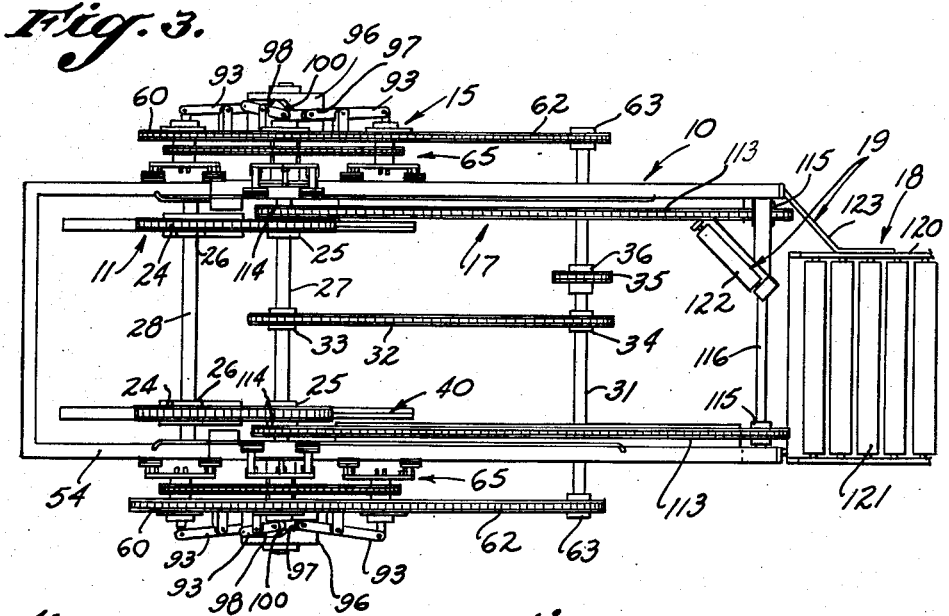
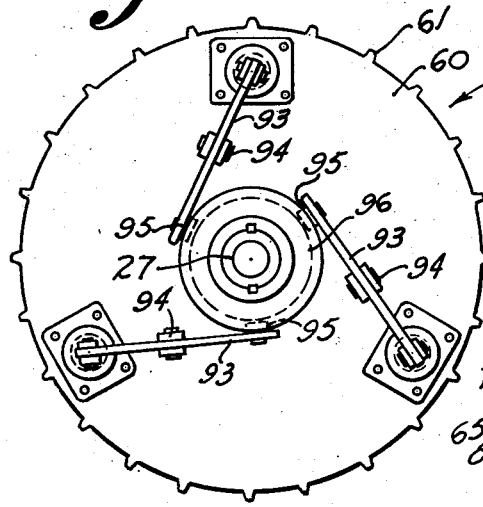
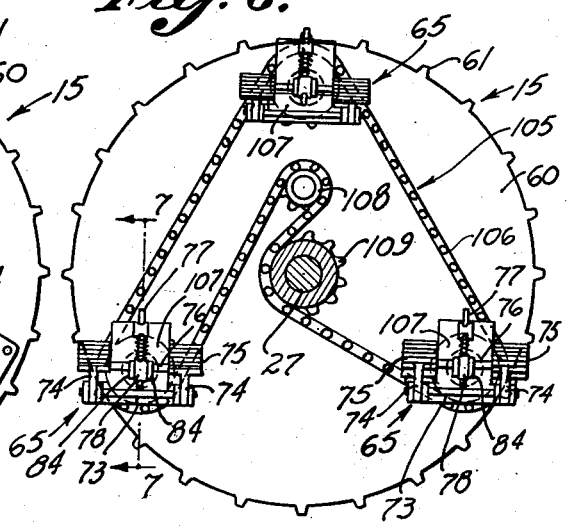
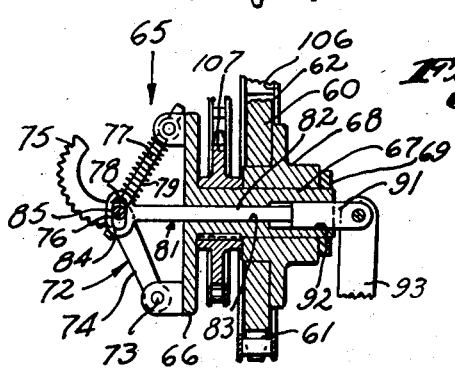
INVENTOR:
QUINTER E. BASHORE
BY HIS ATTORNEYS
HARRIS, KIECH, FOSTER & HARRIS Patented Apr. 27, 1954

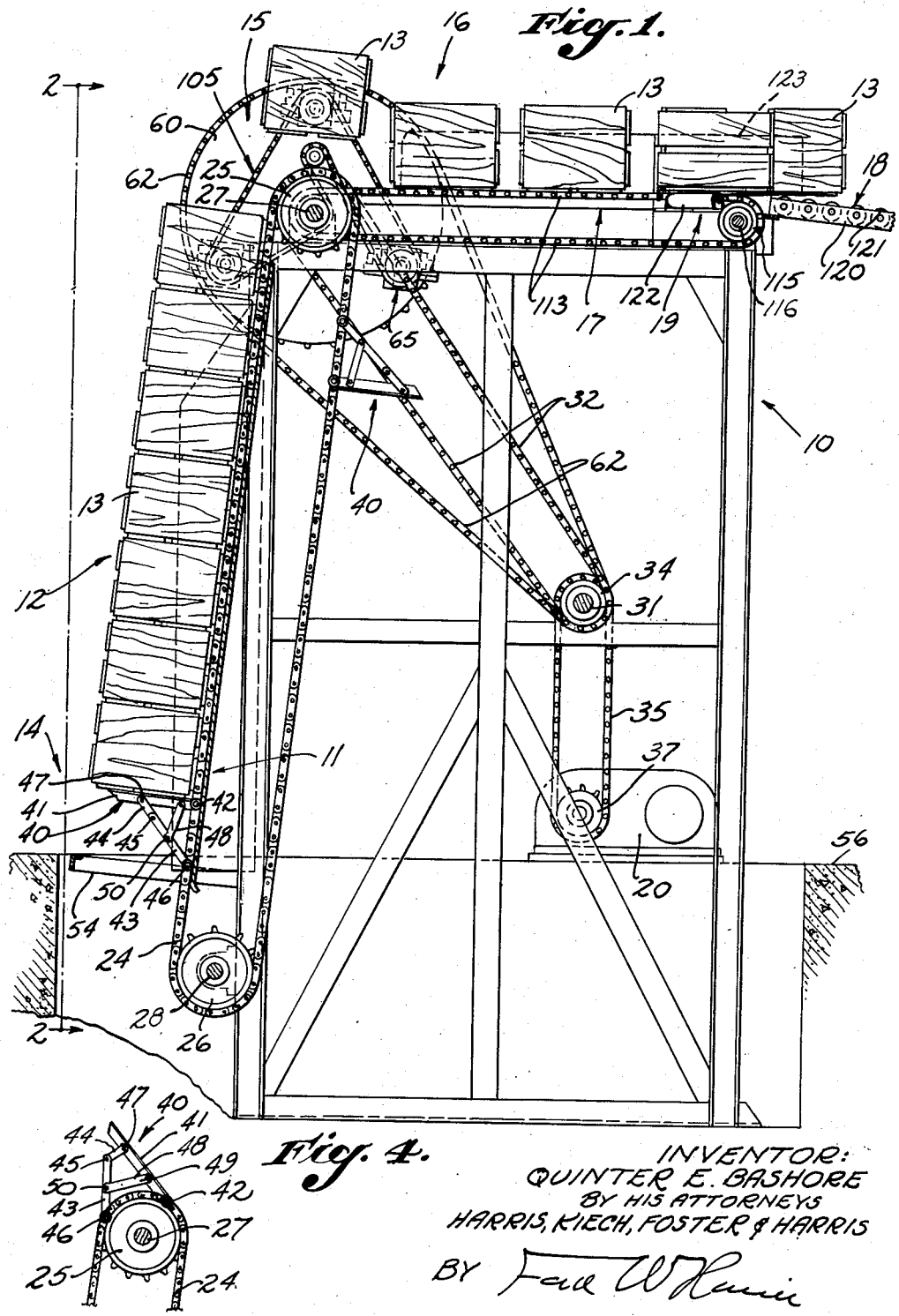

2,676,697

UNITED STATES PATENT OFFICE 2,676,697

BOX-HANDLING APPARATUS

Quinter E. Bashore, Covina, Calif.

Application October 25, 1948, Serial No. 56,384

2 Claims. (Cl. 198—210)

My invention relates to apparatus for handling such articles as boxes, cartons, trays, etc., which articles are all designated hereinafter by the generic term "boxes," and, since the invention was originally embodied in and is particularly applicable to an apparatus for unstacking boxes, I prefer to consider such an embodiment herein for convenience. However, as will be evident hereinafter, various features of the invention may be embodied in other apparatus without departing from the spirit thereof, and it will be understood, therefore, that I do not desire to be limited to the specific embodiment disclosed herein for purposes of illustration.

The present invention embodies improvements on the apparatus disclosed in my copending application Serial No. 757,522, filed June 27, 1947, and now Patent No. 2,590,225, and entitled "Box Handling Mechanism," reference to which is hereby made.

Before proceeding to disclose the present invention in detail, it is convenient to discuss one of the possible industries in which it is applicable with particular advantage. In the citrus industry, for example, extensive handling of boxes containing fruit is necessary in processing the fruit in packing houses, it frequently being necessary to stack and unstack boxes containing the fruit several times between its arrival at the packing house from the groves and its shipment to the consumer. Lemons, for example, are ordinarily picked while partially green and must be stored for a considerable length of time before shipment to permit them to cure. The usual practice is to sort and wash the lemons upon arrival at the packing house and, subsequently, to pack the lemons in boxes which are then placed in storage. After the lemons have been stored for a sufficient length of time, they are then prepared for shipment.

From the foregoing, it will be apparent that the boxes containing the fruit must be handled several times prior to shipment. Since, in order to conserve space, the boxes are frequently placed in stacks of ten or more, it will be apparent that unstacking the boxes, e. g., during removal from storage, presents a serious problem, especially since lemons in particular must be handled carefully in order to prevent bruising.

With the foregoing observations in mind, it is a general object of my invention to provide an apparatus for removing boxes from a stack, preferably one at a time, and for transporting the boxes to a suitable box-receiving station.

More specifically, it is an object to provide an unstacking apparatus which includes means for continuously elevating a stack of boxes from a stack-receiving station, and which includes carriage means for removing successive boxes from the top of the rising stack and for transporting the boxes removed from the stack to the box-receiving station. A related object is to provide an apparatus which includes means for transporting each box from the box-receiving station before arrival of the next box, which means may be a suitable conveyor.

Another object of the invention is to provide an unstacking apparatus of the foregoing general character wherein the carriage means is driven at a higher rate of speed than the elevating means so that each box is lifted clear of the rising stack immediately after it is engaged by the carriage means.

A further object of the invention is to provide a carriage means which is rotatable relative to a supporting structure or frame, and on which a plurality of pairs of box-engaging devices are mounted, the box-engaging devices of each pair being adapted to receive a box therebetween and to convey it to the box-receiving station.

An important object of the invention is to provide an apparatus having means for maintaining the orientation of the box-engaging devices constant with respect to the frame so as to maintain the boxes carried thereby in upright positions at all times while they are being transported to the box-receiving station.

An additional object of the invention is to provide an apparatus wherein the elevating means and the carriage means operate in timed relationship in such a manner that the box-engaging devices of each pair engage each box on opposite surfaces thereof at points substantially adjacent the bottom of the box. This permits the box-engaging devices to engage the strongest portion of each box to prevent damage thereto, which is an important feature of the invention.

Another important object is to provide a construction wherein each pair of box-engaging devices includes a pair of box-engaging members which are adapted to engage opposite vertical surfaces of a box to clamp it therebetween, such box-engaging members providing the sole means for grasping the box.

Still another important object of the invention is to provide a box-handling mechanism of the foregoing character wherein the box-engaging members of each pair of box-engaging devices are movable from inoperative to operative positions along downwardly converging paths so that the weight of a box held thereby tends to increase the clamping forces applied to the box. Thus, the clamping forces applied to the box are proportional to the weight of the box, which is an important feature of the invention.

More specifically, it is an object of the invention to provide a construction wherein the box-engaging members of each pair of box-engaging devices are rotatable toward each other about horizontal axes from inoperative to operative positions and which, when in their operative positions, are inclined upwardly from their respective axes of rotation so that the weight of a box engaged thereby tends to rotate them even closer together to increase the clamping forces applied to the box.

Another important object of the present invention is to provide a construction wherein the box-engaging members are loosely connected to suitable supporting members. Such lost-motion connections between the box-engaging members and the supporting members therefor permit shifting of the box-engaging members with respect to the supporting members to accommodate boxes having irregular, e. g., warped, surfaces, which is an important feature of the invention.

A further object is to provide an apparatus having cam means for moving the box-engaging members between their respective operative and inoperative positions. A related object is to provide a cam means which operates in timed relationship with the carriage means and the stack-elevating means in such a manner that the box-engaging members are moved into their operative positions at substantially the instant that a box in the stack has been elevated to the proper position for removal from the stack. Another object in this connection is to provide a cam means which operates in timed relationship with the carriage means in such a manner that the box is released at substantially the instant that it arrives at the box-receiving station.

Preferably, the stack-elevating means comprises a conveyor which includes one or more endless, flexible conveying members trained over wheels, and which includes one or more box-advancing means connected to the conveying members. For example, the conveying members may be chains, belts, or the like and the wheels over which they are trained may be sprocket wheels, pulleys, or the like.

An important object is to provide an apparatus having a conveying means of the character set forth in the foregoing paragraph wherein the box-advancing means is adapted to be folded or jackknifed into a position such that it will move around wheels of relatively small diameter. This construction reduces the space required by the conveying means to a minimum, which is an important feature of the invention.

Another important object of the present invention is to provide a box-handling apparatus having means for rotating a box about a substantially vertical axis through an angle of substantially 90° while the box is being moved horizontally, substantially without changing the direction of movement of the box. This construction permits the box to be rotated from a position wherein it is moving sidewise to a position wherein it is moving endwise, which is an important feature of the invention.

Still another important object of the invention is to provide a box-handling mechanism of the foregoing general character which handles the boxes gently and with a minimum of jolting so as to substantially eliminate any possibility of damage to the contents of the boxes.

The foregoing objects and advantages of the invention, together with various other objects and advantages thereof which will be evident hereinafter, may be attained through the employment of the exemplary embodiment illustrated in the accompanying drawings and described in detail hereinafter. Referring to the drawings, which are intended as illustrative only:

Fig. 1 is a vertical sectional view of a box-handling apparatus which embodies the invention;

Fig. 2 is a front elevational view of the apparatus and is taken in the direction of the arrows intersecting the broken line 2—2 of Fig. 1;

Fig. 3 is a plan view of the apparatus;

Fig. 4 is a fragmentary sectional view illustrating the operation of a box-advancing means which forms part of the apparatus;

Fig. 5 is an enlarged, fragmentary elevational view showing one side of a carriage member which forms part of the apparatus, Fig. 5 being taken in the direction of the arrows intersecting the broken line 5—5 of Fig. 2;

Fig. 6 is an enlarged, fragmentary sectional view showing the opposite side of the carriage member illustrated in Fig. 5;

Fig. 7 is an enlarged, fragmentary sectional view taken along the broken line 7—7 of Fig. 6;

Fig. 8 is a developed view of a cam which forms part of the apparatus; and

Fig. 9 is a side elevational view of a gripping element which forms part of the apparatus.

Referring particularly to Figs. 1, 2 and 3 of the drawings, I show a box-handling apparatus embodying my invention which includes a frame 10, means indicated generally by the numeral 11 for continuously elevating a stack 12 of boxes 13 from a stack-receiving station 14 along a generally vertical path, carriage means indicated generally by the numeral 15 for removing successive boxes from the rising stack and for moving such boxes to a box-receiving station 16, and conveyors 17 and 18 for moving the boxes from the box-receiving station to some other station (not shown) which may be a suitable processing station, for example. At the junction of the conveyors 17 and 18, I provide means indicated generally by the numeral 19 for rotating each box about a substantially vertical axis through an angle of substantially 90°, each box being adapted to be moved sidewise by the conveyor 17 and endwise by the conveyor 18. The apparatus also includes means 20, which may be a variable speed electric motor, for example, for driving the stack-elevating means 11, the carriage means 15 and the conveyor 17.

Considering the apparatus in more detail, the stack-elevating means 11, which preferably lifts the stack 12 along a slightly inclined path to prevent tipping thereof, includes a pair of endless, flexible conveying members 24 each of which is trained over wheels 25 and 26, the wheels 25 and 26 being fixed on shafts 27 and 28, respectively, which are journalled in suitable bearings carried by the frame 10. In the particular construction illustrated, the flexible conveying members 24 are chains and the wheels 25 and 26 over which they are trained are sprocket wheels.

The stack-elevating means 11 is driven from a shaft 31 by an endless chain 32 which is trained over a sprocket 33 fixed on the shaft 27 of the stack-elevating means and which is trained over a sprocket 34 fixed on the shaft 31. The shaft 31 is driven by the motor 20 through an endless chain 35 which is trained over a sprocket 36 fixed on the shaft 31 and which is trained over a sprocket 37 fixed on the shaft of the motor. Referring to Fig. 1 of the drawings, it will be apparent that if the motor 20 rotates in the clockwise direction, the chains 24 of the stack-elevating means 11 will be driven in the clockwise direction also through the mechanism described.

The elevating chains 24 carry advancing means 40 for supporting and elevating the stack 12. The advancing means 40 comprises a pair of advancing or supporting members 41 upon which the stack 12 is adapted to rest, the supporting members being pivotally connected to the respective chains 24 at 42. The advancing means 40 also includes a pair of toggle joints each comprising first and second toggle elements 43 and 44 which are pivotally interconnected at 45. The first toggle elements 43 are pivotally connected to the respective chains 24 at 46 and the second toggle elements 44 are pivotally connected to the respective supporting members 41 at 47. Link elements 48 extend between the respective supporting members 41 and first toggle elements 43, each link element 48 being pivotally connected to the corresponding supporting member 41 at 49 and being pivotally connected to the corresponding first toggle element 43 at 50.

Referring particularly to Fig. 4 of the drawings, the foregoing construction permits the advancing means 40 to be folded or jackknifed as the portions of the chains 24 lying between the pivot points 42 and 46 engage the sprocket wheels 25, or the sprocket wheels 26. As shown in Fig. 4, the distance between the pivot points 42 and 46 decreases as the chains 24 engage and are wrapped around the sprocket wheels and the toggle joints formed by the toggle elements 43 and 44 are broken to permit movement of the advancing means 40 around the sprocket wheels. With this construction, sprocket wheels having a relatively small diameter may be employed to reduce the space requirements of the elevating means 11, which is an important feature of the invention.

Preferably, two or more advancing means 40 are provided, these being spaced apart along the elevating chains 24 distances such that by the time one of the advancing means has elevated the bottom of a stack 12 to a point above the top of a succeeding stack, the next advancing means will be in a position to lift the succeeding stack.

Each advancing means 40 is adapted to pass through an open, rectangular platform 54 on which a stack 12 of boxes may be placed so that it will be picked up by one of the advancing means as it passes through the platform. The dimensions of the stack-receiving platform 54 must, of course, be such that it will support the stack of boxes in a position to be engaged by one of the advancing means 40 while permitting the advancing means to pass therethrough.

In the particular construction illustrated in the drawings, the apparatus is designed to receive a stack of boxes from a hand truck, or the like, although it will be understood that a suitable automatic conveyor system (not shown) may be provided for moving stacks of boxes into position on the stack-receiving platform 54. In order to permit the stacks of boxes to be placed on the platform 54 by a hand truck or a similar device, the apparatus is preferably located in a pit 55 below the level of the surrounding floor 56. However, it will be understood that locating the apparatus in a pit may not be necessary if an automatic conveyor system is used to move the stacks of boxes into position on the stack-receiving platform 54.

It will thus be apparent that the stack-elevating means 11 is adapted to engage a stack 12 of boxes which has been placed on the stack-receiving platform 54 and is adapted to move the stack continuously in a generally vertical direction toward the carriage means 15. As previously indicated, the carriage means, which will now be described in detail, removes successive boxes from the top of the rising stack and transfers them to the box-receiving station 16, from which they are moved by the conveyors 17 and 18.

The carriage means 15 comprises a pair of carriages or carriage members 60 which are rotatable on the shaft 27 of the stack-elevating means 11. As best shown in Figs. 5 and 6 of the drawings, the carriages comprise discs having sprocket teeth 61 thereon and are, in effect, sprocket wheels. As best shown in Figs. 1, 2 and 3 of the drawings, the carriages 60 are rotated about the shaft 27 by chains 62, the latter being trained over the respective carriages and being trained over sprockets 63 fixed on the shaft 31.

Each of the carriages 60 has rotatably mounted thereon a plurality of box-engaging devices 65, three such devices being provided on each carriage in the particular construction illustrated although this number may be varied if desired. Each of the box-engaging devices 65 on one of the carriages 60 is paired with one of the box-engaging devices on the other carriage, the devices of each pair being adapted to receive the uppermost box in the stack 12 therebetween and being adapted to frictionally engage opposite surfaces of this box as will be discussed in more detail hereinafter. Rotation of the carriages 60 causes the box-engaging devices 65 of each pair to move a box carried thereby to the box-receiving station 16 as will be discussed in more detail hereinafter, such rotation of the carriages being in the clockwise direction as viewed in Fig. 1 of the drawings. The carriages 60 are driven at a speed such that the box-engaging devices 65 move at a speed exceeding that of the rising stack 12 so that each pair of box-engaging devices lifts the box carried thereby clear of the remaining boxes in the stack immediately after engaging it, which is an important feature of the invention. Preferably, the box-engaging devices 65 move at a speed approximately twice that of the rising stack 12 to insure that the box carried by each pair of box-engaging devices is lifted clear of the remaining boxes in the stack. Subsequently, each pair of box-engaging devices 65 moves the box carried thereby along a circular discharge path to the box-receiving station 16.

The construction of the box-engaging devices 65 will now be described with particular reference to Fig. 7 of the drawings wherein one of the devices is shown in detail, the construction of the remaining devices 65 being identical to that of the one shown in Fig. 7. Each box-engaging device 65 includes a supporting member or bracket 66 having a hub 67 which is journalled in a bearing 68 carried by the carriage 60 on which the device is mounted. Axial withdrawal of the hub 67 from the bearing 68 toward the left, as viewed in Fig. 7 of the drawings, is prevented by a ring 69 pressed on the hub 67. A box-engaging member or clamping member 72 is pivotally connected to the supporting bracket 66 by a shaft 73, the clamping member 72 comprising a pair of spaced box-engaging or gripping elements 74 which are preferably provided with corrugated surfaces 75, or the like. The gripping elements 74 are interconnected by a rod 76 to which one end of a link member 77 is pivotally connected, the link member being slidable in an opening through a fitting 78 which is rotatable on the rod 76. The opposite end of the link member 77 is pivotally connected to the supporting bracket 66. A compression spring 79 encircles the link member 77 and tends to rotate the rod 76 and the gripping elements 74 connected thereto in the counter-clockwise direction, as viewed in Fig. 7 of the drawings.

The gripping elements 74 and the link member 77 form a toggle joint which is adapted to be broken by a plunger 81 to permit counterclockwise rotation of the gripping elements 74, as viewed in Fig. 7 of the drawings, the plunger 81 having a stem 82 which is slidable in a bore 83 in the hub 67 of the bracket 66 and which terminates in eyes 84 having slots 85 therein. The rod 76 connecting the gripping elements 74 extends through the slots 85 in the eyes 84, the eyes being disposed on opposite sides of the fitting 78 providing the pivotal connection between the link member 77 and the rod 76 to prevent axial movement of the link member. It will be apparent that the purpose of the elongated slots 85 is to permit vertical movement of the rod 76 with respect to the plunger 81 as the gripping elements 74 rotate about the shaft 73.

The gripping elements 74 are loosely mounted on the pivot shaft 73 and are loosely connected to the rod 76 therebetween, as by being provided with enlarged holes 73a and 76a, Fig. 9, for the pivot shaft 73 and the rod 76, respectively. Thus, the gripping elements 74 may shift or wobble relative to each other and to the supporting bracket 66 to accommodate irregular box surfaces. Thus, if a box having a warped surface is encountered, the gripping elements 74 may shift with respect to each other so that they are different distances from the supporting bracket 66 to accommodate such a warped surface. Also, because of the lost-motion connection between the gripping elements 74 and the pivot shaft 73, the gripping elements may twist relative to the pivot shaft to aid in accommodating warped boxes.

The clamping member 72 of each box-engaging device is rotatable about the axis of the pivot shaft 73 from a retracted, or inoperative position to an extended, or operative position wherein the gripping elements 74 thereof engage a box 13. The clamping members 72 of the lowermost box-engaging devices 65 visible in Fig. 2 of the drawings are in their retracted, or inoperative positions, and the clamping member of the box-engaging device shown in Fig. 7 is in its extended, or operative position. As previously indicated, the gripping elements 74 and the link member 77 pivotally connected to the rod 76 between the gripping elements form a toggle joint which is adapted to be broken by the plunger 81 upon movement of this plunger toward the left, as viewed in Fig. 7 of the drawings. After the toggle joint is broken, the spring 79 aids in rotating the clamping member 72 toward its operative position.

Continuing to refer particularly to Fig. 7 of the drawings, the plunger 81 is provided with a head 91 which is slidable in a counterbore 92 in the hub 67 of the bracket 66, the stem and head of the plunger cooperating to form a shoulder which is adapted to seat on a shoulder at the junction of the bore 83 and the counterbore 92 to limit rotation of the clamping member 72 beyond its operative position. The plunger 81 of each box-engaging device 65 has pivotally connected thereto a lever 93, each of the levers 93 being pivotally connected intermediate its ends to the carriage 60 carrying the corresponding box-engaging devices by a pin 94. Each lever 93 carries a rotatable cam follower 95 which engages a stationary cam 96 carried by the frame 10 and arranged concentrically with the shaft 27 on which the carriages 60 rotate, there being one cam 96 for each carriage 60. A development of one of the cams 96 is shown in Fig. 8 of the drawings and, referring thereto, each cam is provided with a cam slot which receives the cam followers 95 on the levers 93 carried by the corresponding carriage 60. As shown in Fig. 8 of the drawings, the cam slot comprises two dwells 97 and 98 connected by cam surfaces 99 and 100. As each carriage 60 rotates, the cam followers 95 on the levers 93 carried thereby move along the cam slot provided by the corresponding cam 96, each cam follower maintaining the clamping member 72 of the box-engaging device 65 controlled thereby in its retracted position when in engagement with the dwell 97 and maintaining the clamping member in its extended position when in engagement with the dwell 98. As each cam follower 95 moves through the corresponding cam slot from the dwell 97 to the dwell 98, the cam surface 99 produces movement of the corresponding clamping member from its retracted position to its extended position, and as each cam follower moves from the dwell 98 to the dwell 97, the cam surface 100 produces movement of the corresponding clamping member from its extended position to its retracted position. Thus, the cams 96 positively control the positions of the clamping members 72 of the various box-engaging devices 65. The cams also force any misaligned boxes in the rising stack into alignment gently, thus eliminating any necessity for stack straightening devices.

With the foregoing discussion of the structure of the box-engaging devices 65 in mind, the operation of the carriage means 15 will now be considered in detail. As a stack 12 of boxes is elevated by the stack-elevating means 11, the carriages 60 rotate to bring a pair of the box-engaging devices 65 into a position to engage the uppermost box in the stack, the stack-elevating means and the carriages operating in timed relationship by virtue of the mechanism described previously. As the pair of box-engaging devices reaches a position to engage the uppermost box in the stack, the cam followers 95 on the levers 93 associated with the respective box-engaging devices engage the cam surfaces 99 on the corresponding cams 96 to move the clamping members 72 of the respective devices from their inoperative positions to their operative positions. The cam surfaces 99 are so positioned that they cause the clamping members 72 to engage the box near its bottom to take advantage of the greater strength of the box at this point, which is an important feature of the invention.

Referring particularly to Figs. 2 and 7 of the drawings, it will be noted that the clamping members 72, when in their operative positions, are inclined upwardly from their respective pivot shafts 73 so that as the gripping elements 74 are urged into frictional engagement with opposite surfaces of the box by the cams 96 and the compression springs 79, the weight of the box tends to cause the clamping members to rotate downwardly. This causes the gripping elements 74 of the respective box-engaging devices 65 to move toward each other so as to apply clamping forces to opposite surfaces of the box which are proportional to the weight of the box. In other words, the greater the weight of the box, the greater the clamping forces applied thereto by the gripping elements 74. Since movement of the clamping members 72 toward their operative positions is positively controlled by the cams 96, the clamping members will be moved into engagement with the box gradually so that the box will be picked up gently.

As the clamping members 72 of each pair of box-engaging devices 65 engage and securely clamp the uppermost box in the stack therebetween in the foregoing manner, the box is lifted clear of the remaining boxes in the stack because of the fact that the carriages 60 are driven at a speed such that the speed of the box-engaging devices exceeds the speed of the rising stack 12, the speed of the box-engaging devices preferably being approximately twice that of the rising stack in order to insure that the box will be lifted clear as soon as it is picked up by the box-engaging devices. As the carriages 60 rotate, the box is moved in a circular discharge path toward the box-receiving station 16. At the same time, the stack-elevating means 11 continues to elevate the stack of boxes so that the next box in the stack is moved into a position to be picked up by the next pair of box-engaging devices 65.

As the box being carried by one of the pairs of box-engaging devices 65 reaches the box-receiving station 16, the corresponding cam followers encounter the cam surfaces 100 of the corresponding cams 96 and, acting through the corresponding levers 93 and plungers 81, move the corresponding clamping members 72 from their operative positions to their inoperative positions, thereby releasing the box. The cam surfaces 100 are so located that they cause the clamping members 72 to disengage the box just before the bottom of the box engages the conveyor 17 so that the contents of the box will not be jostled. I have found, for example, that the cam surfaces 100 may be so positioned that the box, when disengaged by the clamping members 72, will drop considerably less than one quarter of an inch, which is insufficient to damage even fruit which bruises easily.

Since the positions of the cam surfaces 99 which actuate the box-engaging devices 65 to extend the clamping members 72 and the operation of the stack-elevating means 11 are preferably so related that the clamping members of each pair of devices engage opposite surfaces of the box adjacent the bottom of the box to take advantage of the additional strength provided by the bottom, it will be apparent that the center of gravity of the box will be above the points of contact between the surfaces of the box and the clamping members so that the box will have a tendency to overturn. Consequently, it is necessary to provide means for maintaining the box in an upright position, such a means being associated with each carriage 60 and being indicated generally by the numeral 105. As best shown in Fig. 6 of the drawings, each means 105 for maintaining the boxes upright includes a chain 106 which is trained around sprockets 107 carried by the respective box-engaging devices 65, an idling sprocket 108 carried by the corresponding carriage 60, and a sprocket 109. The sprockets 107 are fixed on the hubs 67 of the brackets 66 associated with the respective box-engaging devices, as best shown in Fig. 7 of the drawings. The idling sprockets 108 are rotatable relative to the respective carriages 60 on which they are mounted and the sprocket 109 associated with each carriage is rigidly connected to the frame 10 so that it remains stationary during rotation of the carriage with which it is associated. Consequently, as each carriage 60 rotates relative to the frame 10, the stationary sprocket 109, acting through the chain 106 and the sprocket 107, causes the box-engaging devices 65 to rotate relative to the carriage in a direction opposite to the direction of rotation of the carriage relative to the frame. In order to maintain the boxes carried by the box-engaging devices 65 upright, the diameters of the sprockets 107 and the diameter of the fixed sprocket 109 associated with each of the carriages 60 must all be equal so that the speed of rotation of the box-engaging devices with respect to the carriages on which they are mounted will be equal to the speed of rotation of the carriages with respect to the frame 10 in order to maintain constant the orientation of the box-engaging devices with respect to the frame. Thus, the boxes are maintained upright as they are moved from the stack 12 to the box-receiving station 16.

It will be noted that although the foregoing means 105 for maintaining the boxes upright would not be essential if the cam surfaces 99 were so positioned that the clamping members 72 engage the boxes above the centers of gravity thereof, the boxes would then be free to swing and damage to the contents thereof might result. The mechanism previously described, in addition to maintaining the boxes in upright positions, prevents any swinging of the boxes, which is an important feature of the invention.

As the boxes transported by the carriage means 15 reach the box-receiving station 16, they are removed therefrom by the conveyors 17 and 18, as previously indicated. The conveyor 17 may, for example, include a pair of chains 113 each of which is trained over sprockets 114 and 115, the sprockets 114 being fixed on the shaft 27 and the sprockets 115 being carried by a shaft 116 journalled in suitable bearings carried by the frame 10. Since the shaft 27 is driven by the chain 32 in the manner previously described, it will drive the conveyor 17, as will be apparent.

As best shown in Figs. 1 and 3 of the drawings, the conveyor 18 comprises a ramp 120 which is inclined downwardly away from and forms a continuation of the conveyor 17, the ramp carrying a plurality of rollers 121 over which the boxes move. The means 19 for rotating each box about a substantially vertical axis as it moves from the conveyor 17 onto the conveyor 18 includes a roller 122 which is adapted to engage the bottom of the box at one end thereof to remove the weight of one end of the box from the corresponding chain 113, the roller being rotatable about an axis inclined at an angle of approximately 45° with respect to the direction of movement of the box on the conveyors 17 and 18. The rotating means 19 also includes a stop, exemplified as a guard rail 123, which serves to restrain one end of the box so that the opposite end thereof is moved onto the conveyor 18 by one of the chains 113 of the conveyor 17, the inclined roller 122 serving to permit free rotation of the box. Thus, each box is moved sidewise by the conveyor 17 until one end of the box rests on the inclined roller 122 and engages the guard rail 123, whereupon the other end of the box is moved forwardly to rotate the box into a position such that it moves endwise along the conveyor 18, which is an important feature of the invention.

I have found that my box-unstacking apparatus is capable of handling boxes in a very gentle manner because of the fact that they are picked up gently by the box-engaging devices 65, and because of the fact that the boxes are not released by the devices 65 until they have been placed on or substantially on the conveyor 17. The mechanism for maintaining the boxes upright as they are removed from the stack and transported to the box-receiving station 16 also eliminates any possibility of damage to the contents of the boxes which might result if the boxes were permitted to swing freely from the carriages 69.

In addition to being capable of handling boxes with a minimum of jolting, the apparatus is also capable of stacking boxes at a high rate of speed. For example, I have found that a machine constructed substantially in accordance with the foregoing disclosure is capable of unstacking boxes at a rate of ninety per minute.

Although I have described an exemplary embodiment of my invention herein for purposes of illustration, it will be understood that I do not desire to be limited thereto since various changes, modifications and substitutions may be incorporated in the embodiment disclosed without necessarily departing from the spirit of the invention. Consequently, I hereby reserve the right to all such changes, modifications and substitutions as properly come within the scope of my invention as set forth in the appended claims.

I claim as my invention:

1. In a box-handling apparatus, the combination of: a pair of supporting members; a pair of clamping members adapted to engage opposite surfaces of a box; means pivotally connecting said clamping members to said supporting members, respectively, said pivotal connecting means providing substantially parallel axes of rotation for said clamping members to permit rotation of said clamping members inwardly toward each other into engagement with opposite surfaces of a box and to permit rotation of said clamping members outwardly away from each other to release the box, said pivotal connecting means further providing lost-motion connections between said clamping members and said supporting members to permit shifting of said clamping members relative to said supporting members to accommodate irregular box surfaces; means for moving said supporting members and the respective clamping members along parallel paths; and means for moving said clamping members inwardly toward each other and outwardly away from each other at predetermined points on said paths.

2. A box-handling apparatus according to claim 1 wherein each of said clamping members is provided with a pair of relatively shiftable spaced box-engaging elements.

References Cited in the file of this patent

UNITED STATES PATENTS

| Number | Name | Date |
|---|---|---|
| 115,406 | Woolf | May 30, 1871 |
| 276,008 | Dickey | Apr. 17, 1883 |
| 791,601 | Andrus | June 6, 1905 |
| 1,510,096 | Miller | Sept. 30, 1924 |
| 1,676,957 | Leaver | July 10, 1928 |
| 1,785,374 | Bronson | Dec. 16, 1930 |
| 1,969,994 | Stevenson | Aug. 14, 1934 |
| 2,362,517 | Woodberry | Nov. 14, 1944 |
| 2,424,252 | Orlando | July 22, 1947 |
| 2,590,225 | Bashore | Mar. 25, 1952 |

FOREIGN PATENTS

| Number | Country | Date |
|---|---|---|
| 283,754 | Germany | Apr. 23, 1915 |